(12) United States Patent
Benisty

(10) Patent No.: US 12,248,703 B1
(45) Date of Patent: Mar. 11, 2025

(54) HOST QUEUES RECOVERY IN EXCEPTION FLOWS

(71) Applicant: Western Digital Technologies, Inc., San Jose, CA (US)

(72) Inventor: Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/386,797

(22) Filed: Nov. 3, 2023

(51) Int. Cl.
*G06F 3/06* (2006.01)

(52) U.S. Cl.
CPC .......... *G06F 3/0658* (2013.01); *G06F 3/0659* (2013.01); *G06F 3/0679* (2013.01); *G06F 3/0619* (2013.01)

(58) Field of Classification Search
None
See application file for complete search history.

(56) References Cited

U.S. PATENT DOCUMENTS

| | | | |
|---|---|---|---|
| 9,489,173 B2 | 11/2016 | Kegel | |
| 9,507,722 B2 | 11/2016 | Desai et al. | |
| 10,387,078 B1 | 8/2019 | Benisty | |
| 10,606,776 B2 | 3/2020 | Gupta et al. | |
| 2016/0117119 A1* | 4/2016 | Kim | G06F 13/1642 711/103 |
| 2019/0278514 A1* | 9/2019 | Chaturvedi | G06F 3/0659 |
| 2019/0317909 A1* | 10/2019 | Gupta | G06F 13/1668 |
| 2021/0182219 A1* | 6/2021 | Benisty | G06F 3/0604 |
| 2022/0137832 A1* | 5/2022 | Wang | G06F 11/3034 711/154 |
| 2023/0161494 A1* | 5/2023 | Benisty | G06F 3/0647 711/103 |
| 2024/0311250 A1* | 9/2024 | Spiegelman | G06F 11/1435 |

FOREIGN PATENT DOCUMENTS

CN 107153580 A 9/2017

* cited by examiner

*Primary Examiner* — Kevin Verbrugge
(74) *Attorney, Agent, or Firm* — PATTERSON + SHERIDAN, LLP

(57) ABSTRACT

In some exception flows, a device controller may need to store and subsequently recover a current state of a host queue. In these particular exception flows, recovering the current state of the host queue is complex due to the varying states a host queue may be in at the time of storing, including having pending commands in the host queue. Examples of such exception flows include low power modes in client SSDs and live migrations in enterprise SSDs. Using dummy host submission and completion queues during the host queue recovery process allows the device controller to efficiently operate even when there are pending commands in the host queue. The dummy queues may be stored in the HMB, internal DRAM, or any other system dummy buffer (i.e., in a different device or tenant).

20 Claims, 7 Drawing Sheets

HOST QUEUES RECOVERY IN EXCEPTION FLOWS

BACKGROUND OF THE DISCLOSURE

Field of the Disclosure

Embodiments described herein generally relate to recovering host queues during exception flows.

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. Reading or writing data from a host device to a memory device may be based on a paired submission and completion queue mechanism. In solid state drives (SSD), the submission queue and completion queues are allocated in the host memory. In some exception flows, the device needs to store the current state of the queues and recover them later. Some examples of such exception flows include low power modes in client SSDs and live migration used in enterprise SSDs.

Queue recovery flow is complex, particularly when there are pending commands in the host queue. Currently, queue recovery flow is only used in client SSDs when the client SSDs are in low power states. In this queue recovery flow, there is an assumption by the device controller that the host queues were empty before entering the low power state. When this assumption is true it simplifies queue recovery flow significantly, but provides a drawback because it limits the number of situations queue recovery flows may function. This assumption is not sustainable as SSD technology continues to develop and advance.

The present invention proposes a method for recovering host queues during exception flows.

SUMMARY OF THE DISCLOSURE

In some exception flows, a device controller may need to store and subsequently recover a current state of a host queue. In these particular exception flows, recovering the current state of the host queue is complex due to the varying states a host queue may be in at the time of storing, including having pending commands in the host queue. Examples of such exception flows include low power modes in client SSDs and live migrations in enterprise SSDs. Using dummy host submission and completion queues during the host queue recovery process allows the device controller to efficiently operate even when there are pending commands in the host queue. The dummy queues may be stored in the HMB, internal DRAM, or any other system dummy buffer (i.e., in a different device or tenant).

In one embodiment, a data storage device, comprises: a memory device; and a controller coupled to the memory device, wherein the controller is configured to: store a current state of one or more host queues; and implement a recovery flow to recover the stored state of the one or more host queues, wherein the recovery flow occurs during an exception flow, and wherein the one or more host queues is a completion queue or a submission queue.

In another embodiment, a data storage device, comprises: a memory device; and a controller coupled to the memory device, wherein the controller is configured to: modify a base address of a host queue to point to a dummy buffer; write to a relevant doorbell register to reflect a needed recoverable value; fetch one or more dummy commands from a dummy submission queue; and change the base address of the host queue.

In another embodiment, a data storage device, comprises: means to store data; and a controller coupled to the means to store data, wherein the controller is configured to: modify a base address of a host completion queue to point to a dummy buffer; post at least one dummy completion entry until a tail pointer obtains a correct value; write to a relevant doorbell register to reflect a needed recoverable value for a head pointer; and change the base address of the host completion queue.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

In some exception flows, a device controller may need to store and subsequently recover a current state of a host queue. In these particular exception flows, recovering the current state of the host queue is complex due to the varying states a host queue may be in at the time of storing, including having pending commands in the host queue. Examples of such exception flows include low power modes in client SSDs and live migrations in enterprise SSDs. Using dummy host submission and completion queues during the host queue recovery process allows the device controller to efficiently operate even when there are pending commands in the host queue. The dummy queues may be stored in the HMB, internal DRAM, or any other system dummy buffer (i.e., in a different device or tenant).

Figure 1:
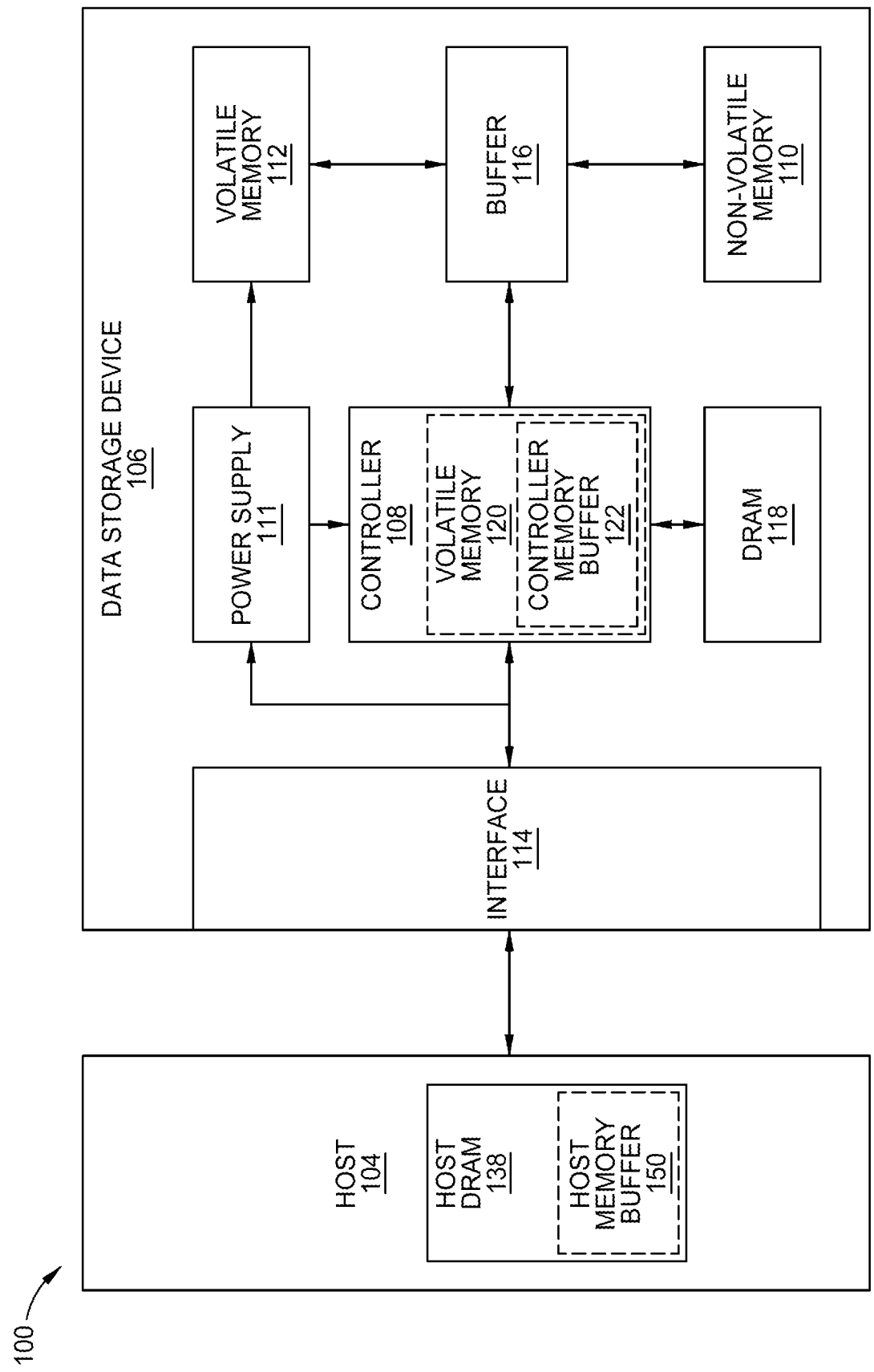
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVMe Flash memory devices may include NAND or NOR-based flash memory devices and may store data based on a charge contained in a floating gate of a transistor for each flash memory cell. In NVMe flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVMe cells. Rows of NVMe cells may be electrically connected using a word line to define a page of a plurality of pages. Respective cells in each of the plurality of pages may be electrically connected to respective bit lines. Furthermore, NVMe flash memory devices may be 2D or 3D devices and may be single level cell (SLC), multi-level cell (MLC), triple level cell (TLC), or quad level cell (QLC). The controller 108 may write data to and read data from NVMe flash memory devices at the page level and erase data from NVMe flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
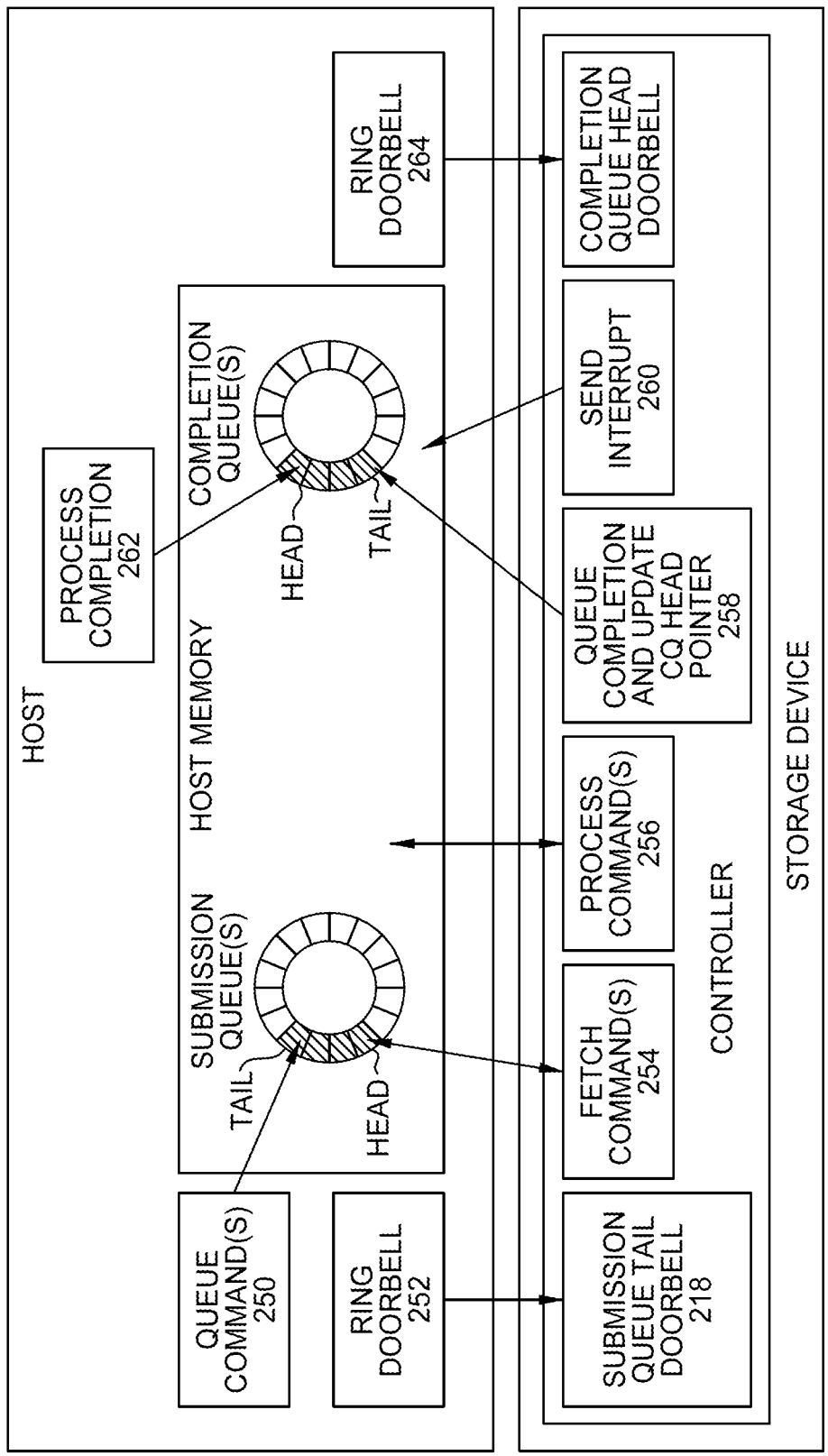
FIG. 2 is a block diagram illustrating a method of operating a storage device to execute a read or write command, according to one embodiment.

FIG. 2 is a block diagram illustrating a method 200 of operating a storage device to execute a read or write command, according to one embodiment. Method 200 may be used with the storage system 100 having a host device 104 and a data storage device 106 comprising a controller 108. Method 200 may be used with the device a host device and a storage device comprising a command processor.

Method 200 begins at operation 250, where the host device writes a command into a submission queue as an entry. The host device may write one or more commands into the submission queue at operation 250. The commands may be read commands or write commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The doorbell signal may be the doorbell 218 of FIG. 2. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives or direct memory access (DMA) reads the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block addresses (LBAs) of the zone, and advancing a write pointer of the zone to identify the next available LBA within the zone.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

In some embodiments, queue commands are placed by the host device into a submission queue. Whereas, completion entries are placed into the associated completion queue by the device controller. In the queue model of a non-volatile memory express (NVMe), a submitter of entries to a memory-based transport queue uses the current tail entry pointer to identify the next open queue slot. The submitter increments the tail entry pointer after placing the new entry to the open queue slot. If the tail entry pointer increments exceeds the queue size, the tail entry shall roll to zero. The submitter may continue to place entries in free queue slots as long as the queue is not full.

The consumer of entries on a memory-based transport queue uses the current head entry pointer to identify the slot containing the next entry to be consumed. The consumer increments the head entry pointer after consuming the next entry from the queue. If the head entry pointer exceeds the queue size, the head entry pointer shall roll to zero. The consumer may continue to consume entries from the queue as long as the empty queue condition is not met.

The creation and deletion of memory-based transport submission queues and associated completion queues are required to be ordered correctly by the host device. The host device creates the completion queue before creating any association submission queue. Submission queues may be created at any time after the associated completion queue is created. The host device deletes all associated submission queues prior to deleting a completion queue. To abort all commands submitted to the submission queue the host device issues a delete I/O submission queue command for that queue.

Figure 3:
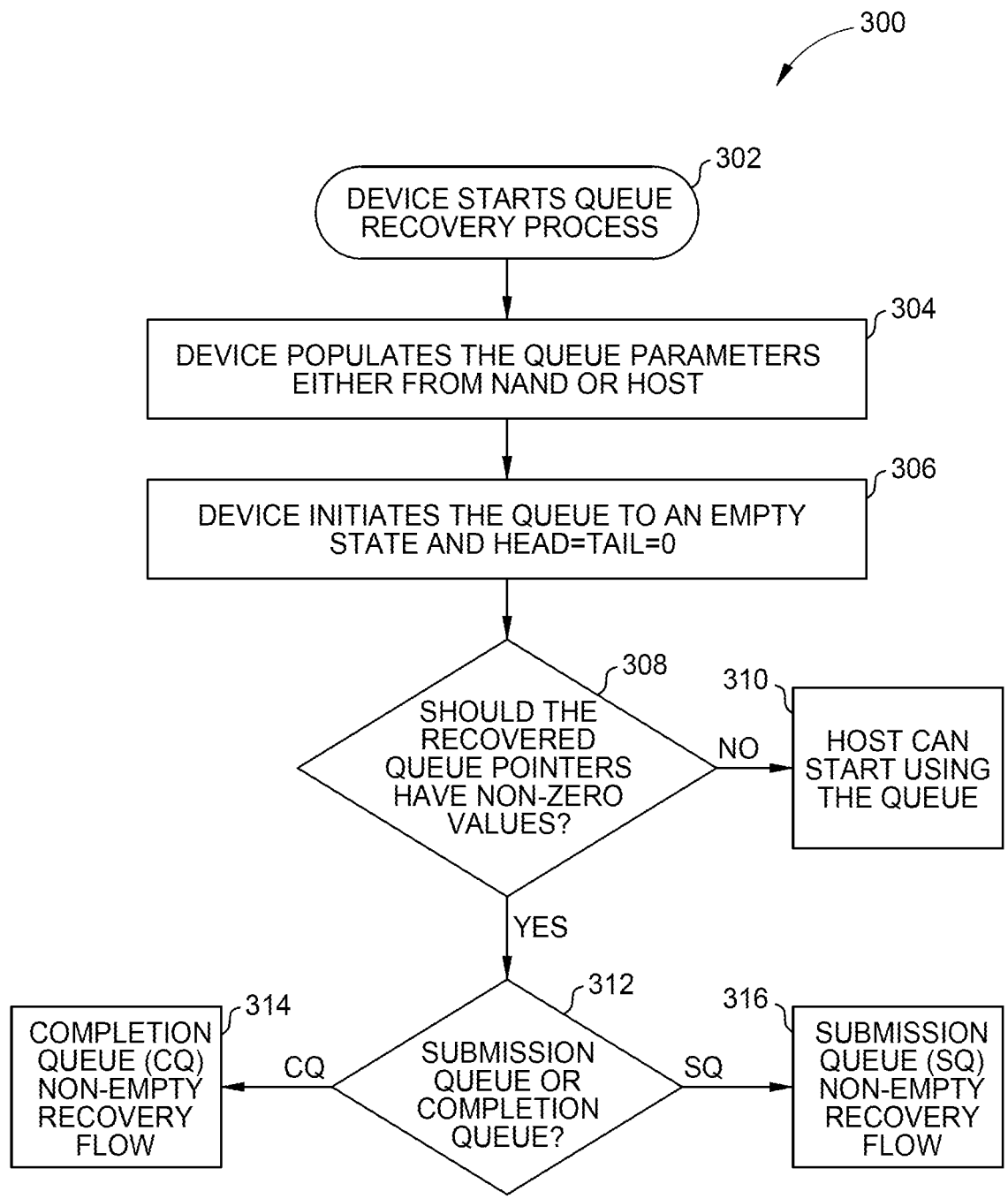
FIG. 3 is a flowchart illustrating a recovery flow process, according to one embodiment.

FIG. 3 is a flowchart illustrating a host queue recovery flow process 300, according to one embodiment. In some embodiments, the host recovery flow process 300 is a first part of a recovery flow process. Prior to host recovery flow process 300, the device controller stores all the parameters of the host queue and the current status of the host queue in the NAND, always on RAM, or in host memory. Subsequently, at 302, the device controller starts the queue recovery flow. At 304, the device controller populates the host queue parameters either from NAND or the host device (e.g., HMB) depending on the system scenario. At 306, the device initiates the host queue to an empty state and the values of the head and tail pointers are zero. At 308, the device controller evaluates whether the recovered host queue pointers have non-zero values. If the recovered host queue pointers do not have non-zero values (i.e., they have a value of zero), then at 310, the recovery flow is completed and the host can start using the host queue. However, if the recovered host queue pointers have non-zero values, then the recovery flow proceeds to a second part of the recovery flow process 312, which includes a separate recovery flow for submission queues 316 and completion queues 314.

Figure 4:
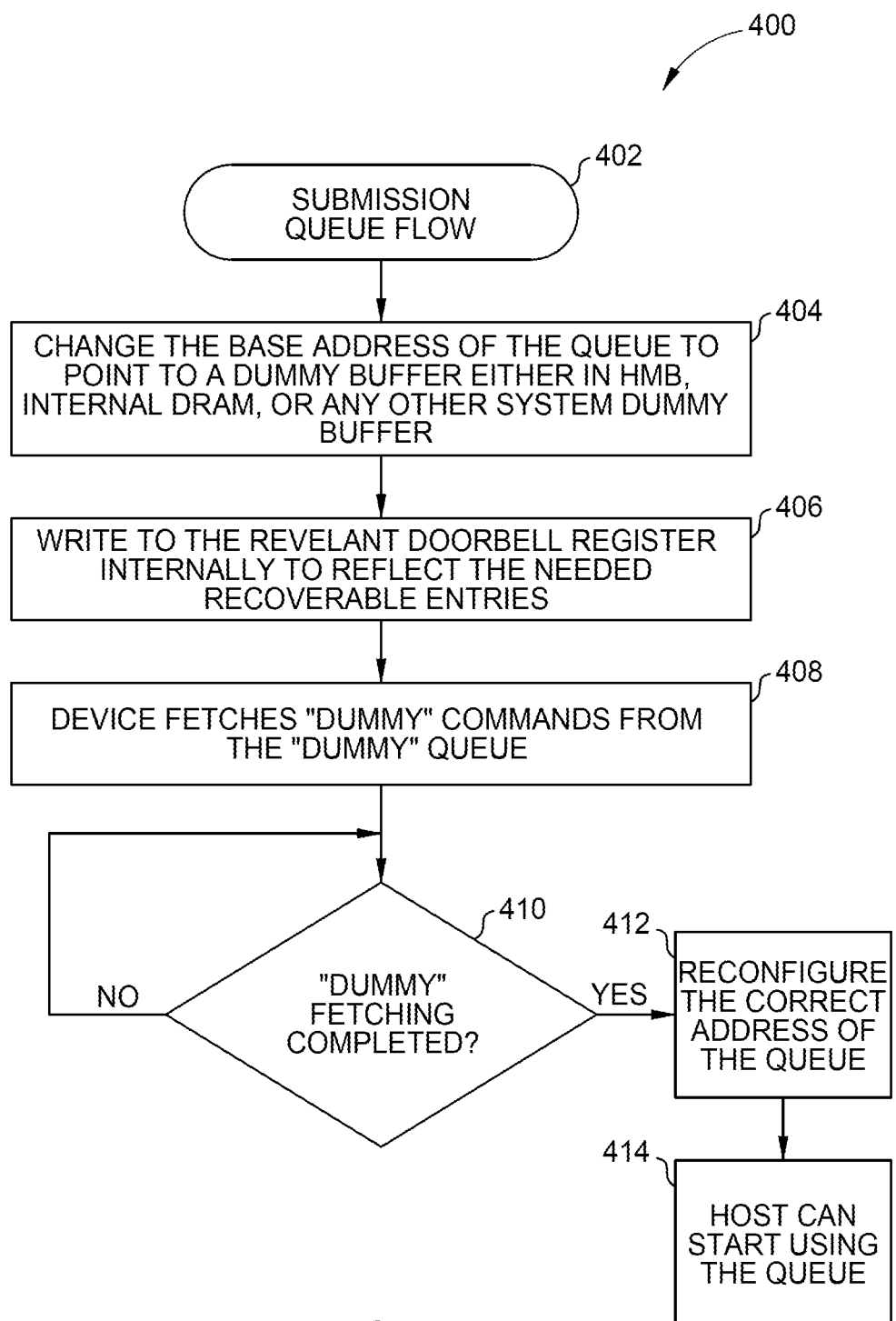
FIG. 4 is a flowchart illustrating a recovery flow process, according to another embodiment.

FIG. 4 is a flowchart illustrating a recovery flow process 400 of a host queue and an associated tail doorbell, according to another embodiment. In some embodiments, recovery flow process 400 is a second part of a recovery flow process for a host submission queue. At 402, a recovery flow process for submission queues starts. At 404, the base address of the host queue is modified to point to a dummy buffer once all the host queue parameters are set and the values of the pointers are zero. The dummy buffer may be implemented either in the HMB, internal DRAM, or any other system dummy buffer. At 406, the device controller internally writes to the relevant doorbell register to reflect the needed recoverable value for the tail pointer. The needed recoverable value for a tail pointer is the number of valid or pending commands that the device controller detected were in the host queue at the beginning of the recovery flow process 400. In response, at 408, the device controller automatically fetches the same number of needed recoverable values as dummy commands from the dummy submission queue. At 410, the device controller determines if the dummy commands have been completely fetched. Otherwise, the device controller will wait until the dummy commands have been completely fetched. Once the dummy commands have been completely fetched and the dummy queue is empty, at 412, the device controller will correct the base address of the host queue (i.e., reconfigure previously modified base address at 404 to the original base address of the host queue). At 414, the host queue is operational and the host device may start using the host queue.

Figure 5:
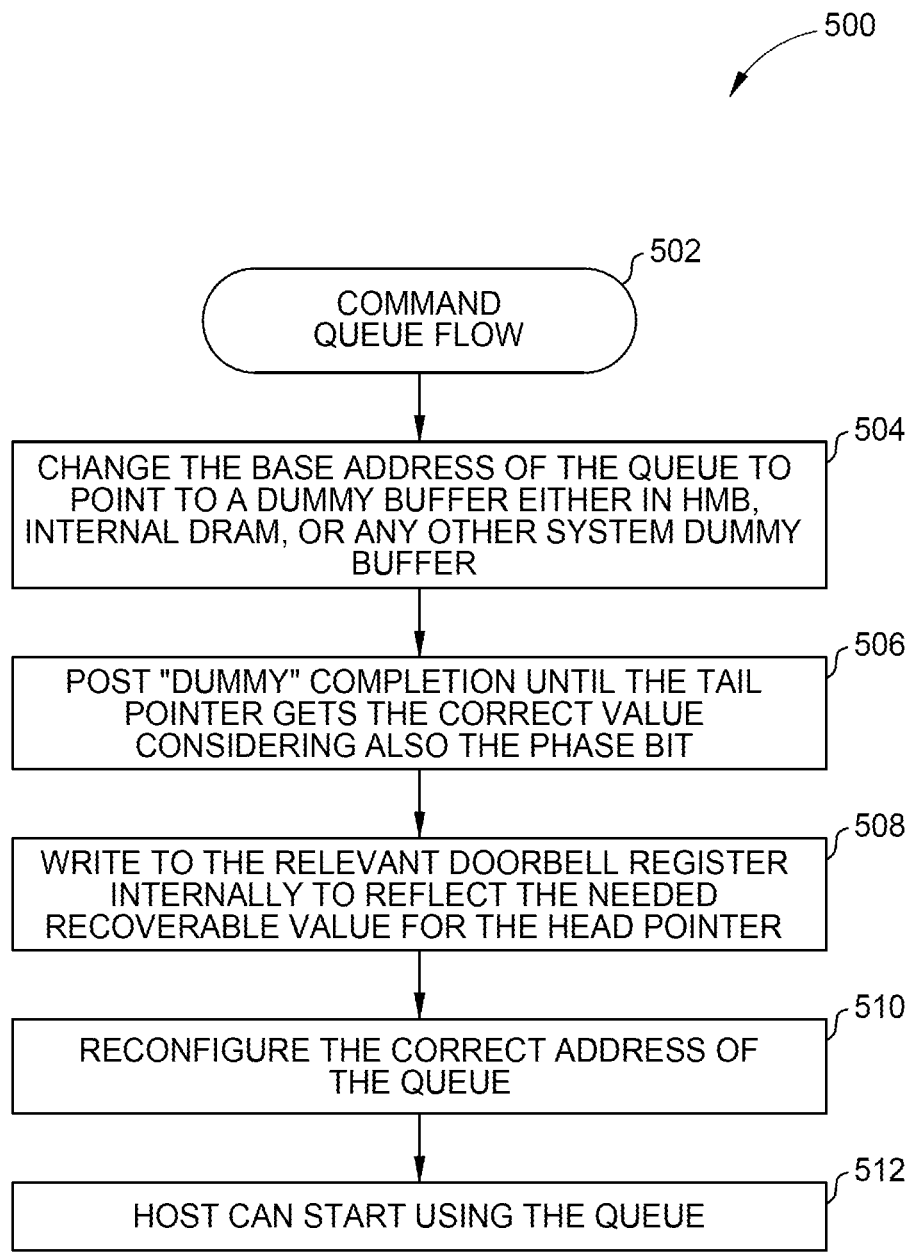
FIG. 5 is a flowchart illustrating a recovery flow process, according to another embodiment.

FIG. 5 is a flowchart illustrating a recovery flow process 500 of a host completion queue and associated doorbell, according to another embodiment. In some embodiments, recovery flow process 500 is a second part of a recovery flow process for a host completion queue. At 502, a recovery flow process for host completion queues starts. At 504, the base address of the host completion queue is modified to point to the dummy buffer once all the host queue parameters are set and the values of the pointers are set to zero. The dummy buffer may be implemented either in the HMB, internal DRAM, or any other system dummy buffer. At 506, the device controller posts several dummy completion entries until the tail pointer has the needed value. At this step, the device controller may also consider the phase bit that indicates the host queue wrap flag. At 508, the device controller initiates an internal transaction towards the head doorbell register to reflect the needed recoverable value for the head pointer. At 510, the device controller will correct the base address of the host queue (i.e., reconfigure previously modified base address at 504 to the original base address of the host queue). At 512, the host queue is operational and the host device may start using the host queue.

Figure 6:
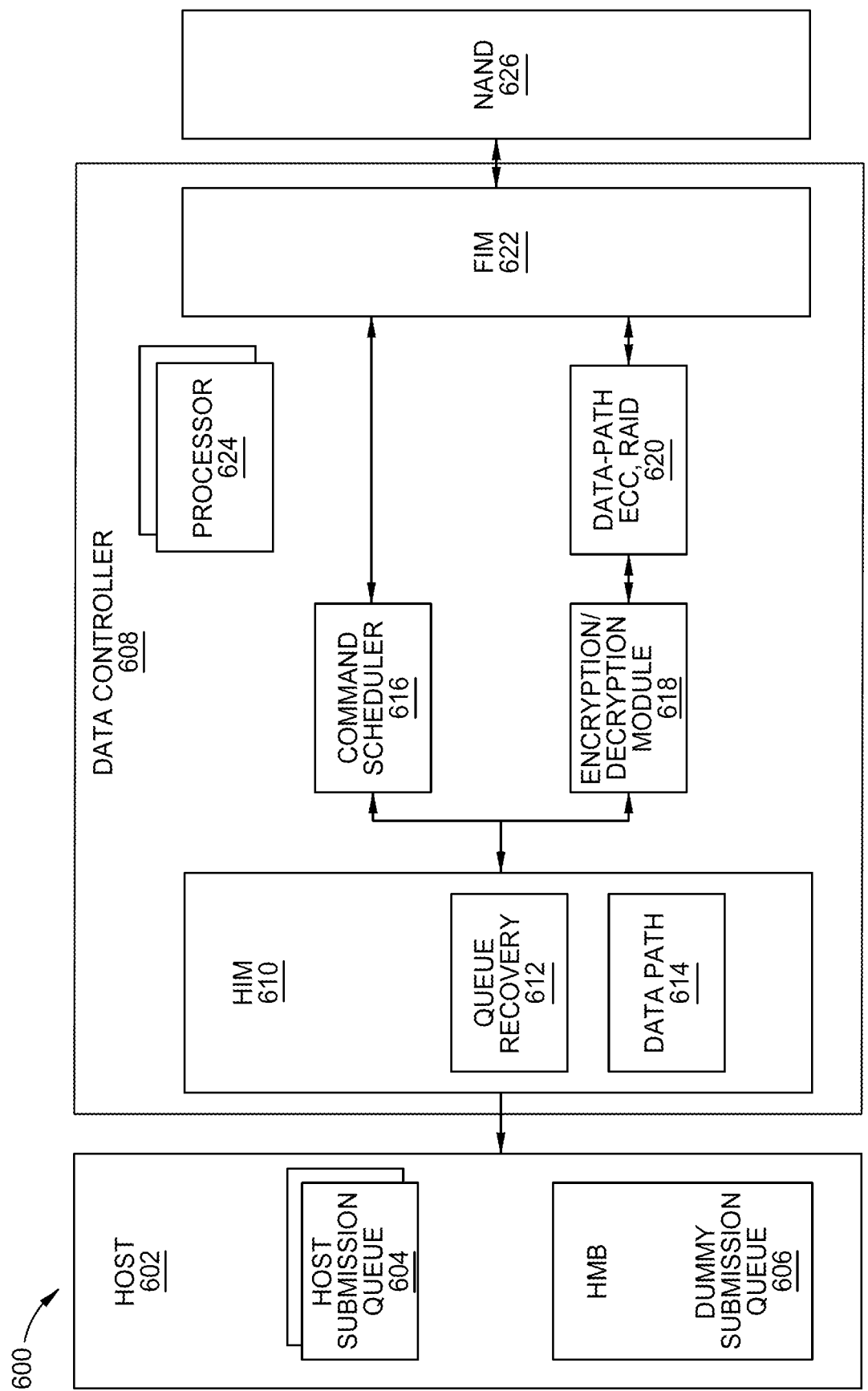
FIG. 6 is a block diagram illustrating a storage system, according to one embodiment.

FIG. 6 is a block diagram illustrating a storage system 600 with a dummy queue implemented in a HMB, according to one embodiment. The storage system 600 with a dummy queue implemented in a HMB includes a host device 602, device controller 608, and a memory device (e.g., NAND) 626. The host device 602 includes one or more host submission queues 604 and a dummy submission queue 606 stored in the HMB of the host device. The device controller 608 further comprises a host interface module (HIM) 610, a command scheduler 616, an encryption and decryption module 618, a data-path error correction code (ECC) and/or RAID module 620, a flash interface module (FIM) 622, and one or more processors 624. The HIM 610 further includes a queue recovery module 612 and data path module 614. In other embodiments, the dummy submission queue may implemented in internal DRAM.

Figure 7:
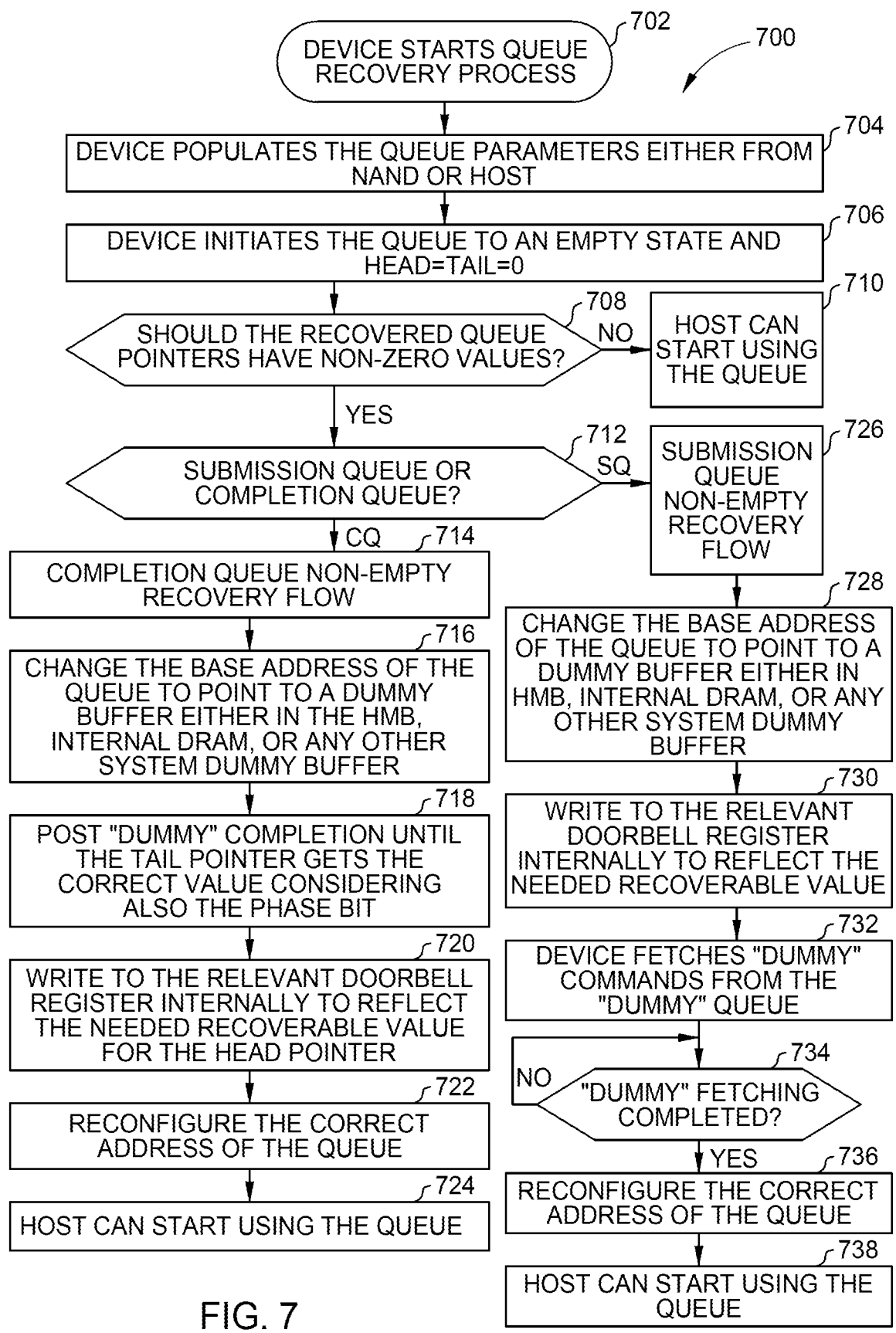
FIG. 7 is a flowchart illustrating a recovery flow process, according to another embodiment.

FIG. 7 is a flowchart illustrating a recovery flow process 700, according to another embodiment. Prior to recovery flow process 700, the device controller stores all the parameters of the host queue and the current status of the host queue in the NAND, always on RAM, or in host memory. Subsequently, at 702, the device controller starts the queue recovery flow. At 704, the device controller populates the host queue parameters either from NAND or the host device (e.g., HMB) depending on the system scenario. At 706, the device initiates the host queue to an empty state and where the values of the head and tail pointers are zero. At 708, the device controller evaluates whether the recovered host queue pointers have non-zero values. If the recovered host queue pointers do not have non-zero values (i.e., they have a value of zero), then at 710, the recovery flow is completed and the host can start using the host queue. However, if the recovered host queue pointers have non-zero values, then device controller will identify if the host queue is a completion queue or submission queue. The recovery flow process will be different for non-empty submission queues 726 and non-empty completion queues 714.

At 716, the base address of the host completion queue is modified to point to the dummy buffer once all the host queue parameters are set and the values of the pointers are set to zero. The dummy buffer may be implemented either in the HMB, internal DRAM, or any other system dummy buffer. At 718, the device controller then posts several dummy completion entries until the tail pointer has the needed value. At this step, the device controller may also consider the phase bit that indicates the host queue wrap flag. At 720, the device controller initiates an internal transaction towards the head doorbell register to reflect the needed recoverable value for the head pointer. At 722, the device controller will correct the base address of the host queue (i.e., reconfigure previously modified base address at 716 to the original base address of the host queue). At 724, the host queue is operational and the host device may start using the host queue.

If the host queue is a host submission queue, at 728, the base address of the host queue is modified to point to a dummy buffer once all the host queue parameters are set and the values of the pointers are zero. The dummy buffer may be implemented either in the HMB, internal DRAM, or any other system dummy buffer. At 730, the device controller internally writes to the relevant doorbell register to reflect the needed recoverable value for the tail pointer. In response, at 732, the device controller automatically fetches the dummy commands from the dummy submission queue. At 734, the device controller determines if the dummy commands have been completely fetched. Otherwise, the device controller will wait until the dummy commands have been completely fetched. Once the dummy commands have been completely fetched and the dummy queue is empty, at 736, the host queue is reconfigured to the correct address (i.e., the address of the host queue is changed back to the initial address at 726). At 738, the host queue is operational and the host device may start using the host queue.

Using dummy host submission and completion queues to implement host queue recovery flow allows the device controller to easily recover the current state of host queues no matter the state of the host queues and without assuming that the host queue is empty prior to the recovery flow. The dummy queues may be implemented in the HMB, internal DRAM, or any other system dummy buffer. The recovery flow process may be easily implemented without adding additional features to the controller, since the recovery process already uses existing features of the SSD controller. It is contemplated that non-contiguous queues may be sued with all relevant chunks of the queues being configured to point to the same dummy queue.

In some exception flows, a device controller may need to store and subsequently recover a current state of a host queue. In these particular exception flows, recovering the current state of the host queue is complex due to the varying states a host queue may be in at the time of storing, including having pending commands in the host queue. Examples of such exception flows include low power modes in client SSDs and live migrations in enterprise SSDs. Using dummy host submission and completion queues during the host queue recovery process allows the device controller to efficiently operate even when there are pending commands in the host queue. The dummy queues may be stored in the HMB, internal DRAM, or any other system dummy buffer (i.e., in a different device or tenant).

In one embodiment, a data storage device, comprises: a memory device; and a controller coupled to the memory device, wherein the controller is configured to: store a current state of one or more host queues; and implement a recovery flow to recover the stored state of the one or more host queues, wherein the recovery flow occurs during an exception flow, and wherein the one or more host queues is a completion queue or a submission queue. The exception flow is a low power mode in a memory storage device of a tenant. The exception flow is a live migration of the stored state of the one or more host queues to a different memory storage device. The controller is further configured to use a dummy queue. The recovery flow is completed without assumptions on the state of the host queue. The recovery flow further comprises: populating a queue parameter of the one or more host queues from a NAND or a host; and initiating the one or more host queues while the one or more host queues is in an empty state, wherein the one or more host queues are in an empty state while a head entry pointer and a tail pointer of the one or more host queues are zero. The controller is further configured to implement a second recovery flow if the head pointer and the tail pointer are a non-zero value. The one or more host queues are non-contiguous. The controller is further configured to point a relevant chunk of the one or more host queues to a dummy queue. The relevant chunk of the one or more host queues point to the same dummy queue. The controller is further configured to: modify a base address of the one or more host queues to point to a dummy buffer; write to a relevant doorbell register to reflect a needed recoverable value; fetch one or more dummy commands from the dummy buffer; and change the base address of the one or more host queues. The controller is further configured to: modify a base address of a host completion queue to point to a dummy buffer; post one or more dummy completion entries until a tail pointer obtains a correct value; write to a relevant doorbell register to reflect a needed recoverable value for a head pointer; and change the base address of the host completion queue.

In another embodiment, a data storage device, comprises: a memory device; and a controller coupled to the memory device, wherein the controller is configured to: modify a base address of a host queue to point to a dummy buffer; write to a relevant doorbell register to reflect a needed recoverable value; fetch one or more dummy commands from a dummy submission queue; and change the base address of the host queue. Modifying the base address of the host queue further comprises changing the base address of the host queue from a first state to a second state. Changing the base address of the host queue comprises changing the base address of the host queue from the second state to the first state. The dummy buffer resides in a host memory buffer (HMB), dynamic random-access memory (DRAM), or a system buffer. The base address of the host completion queue is modified to point to the dummy buffer once one or more host queue parameters are set and the values of one or more pointers are set to zero.

In another embodiment, a data storage device, comprises: means to store data; and a controller coupled to the means to store data, wherein the controller is configured to: modify a base address of a host completion queue to point to a dummy buffer; post at least one dummy completion entry until a tail pointer obtains a correct value; write to a relevant doorbell register to reflect a needed recoverable value for a head pointer; and change the base address of the host completion queue. The controller is further configured to evaluate a queue wrap flag condition when posting the at least one dummy completion entry. Changing the base address of the host completion queue reconfigures the base address of the host completion queue to a different state.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
      store a current state of one or more host queues; and
      implement a recovery flow to recover the stored state of the one or more host queues, wherein the recovery flow occurs during an exception flow, and wherein the one or more host queues is a completion queue or a submission queue.

2. The data storage device of claim 1, wherein the exception flow is a low power mode in a memory storage device of a tenant.

3. The data storage device of claim 1, wherein the exception flow is a live migration of the stored state of the one or more host queues to a different memory storage device.

4. The data storage device of claim 1, wherein the controller is further configured to use a dummy queue.

5. The data storage device of claim 4, wherein the recovery flow is completed without assumptions on the state of the host queue.

6. The data storage device of claim 1, wherein the recovery flow further comprises:
   populating a queue parameter of the one or more host queues from a NAND or a host; and
   initiating the one or more host queues while the one or more host queues is in an empty state,
   wherein the one or more host queues are in an empty state while a head pointer and a tail pointer of the one or more host queues are zero.

7. The data storage device of claim 6, wherein the controller is further configured to implement a second recovery flow if the head pointer and the tail pointer are a non-zero value.

8. The data storage device of claim 1, wherein the one or more host queues are non-contiguous.

9. The data storage device of claim 8, wherein the controller is further configured to point a relevant chunk of the one or more host queues to a dummy queue.

10. The data storage device of claim 9, wherein the relevant chunk of the one or more host queues point to the same dummy queue.

11. The data storage device of claim 1, wherein the controller is further configured to:
    modify a base address of the one or more host queues to point to a dummy buffer;
    write to a relevant doorbell register to reflect a needed recoverable value;
    fetch one or more dummy commands from the dummy buffer; and
    change the base address of the one or more host queues.

12. The data storage device of claim 1, wherein the controller is further configured to:
    modify a base address of a host completion queue to point to a dummy buffer;
    post one or more dummy completion entries until a tail pointer obtains a correct value;
    write to a relevant doorbell register to reflect a needed recoverable value for a head pointer; and
    change the base address of the host completion queue.

13. A data storage device, comprising:
    a memory device; and
    a controller coupled to the memory device, wherein the controller is configured to:
       modify a base address of a host queue to point to a dummy buffer;
       write to a relevant doorbell register to reflect a needed recoverable value;
       fetch one or more dummy commands from a dummy submission queue; and
       change the base address of the host queue.

14. The data storage device of claim 13, wherein modifying the base address of the host queue further comprises changing the base address of the host queue from a first state to a second state.

15. The data storage device of claim 14, wherein changing the base address of the host queue comprises changing the base address of the host queue from the second state to the first state.

16. The data storage device of claim 13, wherein the dummy buffer resides in a host memory buffer (HMB), dynamic random-access memory (DRAM), or a system buffer.

17. The data storage device of claim 13, wherein the base address of the host queue is modified to point to the dummy buffer after one or more host queue parameters are set and the values of one or more pointers are set to zero.

18. A data storage device, comprising:
    means to store data; and
    a controller coupled to the means to store data, wherein the controller is configured to:
       modify a base address of a host completion queue to point to a dummy buffer;
       post at least one dummy completion entry until a tail pointer obtains a correct value;
       write to a relevant doorbell register to reflect a needed recoverable value for a head pointer; and
       change the base address of the host completion queue.

19. The data storage device of claim 18, wherein the controller is further configured to evaluate a phase bit indicating a queue wrap flag condition when posting the at least one dummy completion entry.

20. The data storage device of claim 18, wherein changing the base address of the host completion queue reconfigures the base address of the host completion queue to a different state.

* * * * *